US012344976B2

(12) United States Patent
Boegershausen et al.

(10) Patent No.: US 12,344,976 B2
(45) Date of Patent: Jul. 1, 2025

(54) VIBRATING DEVICE FOR AN INSTALLATION FOR PRODUCING A NONWOVEN, FABRIC WEB

(71) Applicant: Voith Patent GmbH, Heidenheim (DE)

(72) Inventors: Andreas Boegershausen, Willich (DE); Alexander Poos, Krefeld (DE)

(73) Assignee: Voith Patent GmbH, Heidenheim (DE)

( * ) Notice: Subject to any disclaimer, the term of this patent is extended or adjusted under 35 U.S.C. 154(b) by 115 days.

(21) Appl. No.: 17/990,393

(22) Filed: Nov. 18, 2022

(65) Prior Publication Data

US 2023/0144648 A1     May 11, 2023

Related U.S. Application Data

(63) Continuation of application No. PCT/EP2021/062602, filed on May 12, 2021.

(30) Foreign Application Priority Data

May 18, 2020    (DE) ................ DE102020113379.0

(51) Int. Cl.
*B65G 27/20*      (2006.01)
*B29C 35/02*      (2006.01)
(Continued)

(52) U.S. Cl.
CPC ........... *D04H 1/70* (2013.01); *B29C 35/02* (2013.01); *B29C 67/20* (2013.01); *B65G 27/20* (2013.01); *B65G 27/32* (2013.01); *B65G 47/24* (2013.01); *C03B 37/10* (2013.01); *D04H 1/4209* (2013.01); *D04H 1/4226* (2013.01); *D04H 1/4234* (2013.01); *D04H 1/4242* (2013.01); *D04H 1/58* (2013.01); *D04H 3/002* (2013.01);
(Continued)

(58) Field of Classification Search
CPC ............... B65G 27/32; B65G 2814/0258; B65G 27/20; D21F 1/18; D21F 1/20; D21F 1/22
See application file for complete search history.

(56) References Cited

U.S. PATENT DOCUMENTS

| 1,841,702 A | | 1/1932 | Berry | |
| 3,659,465 A | * | 5/1972 | Oshima | ............... B06B 1/16 198/758 |

(Continued)

FOREIGN PATENT DOCUMENTS

| DE | 2534998 A1 | 2/1976 |
| DE | 102010039198 A1 | 2/2012 |
| JP | 2000301066 A | * 10/2000 |

*Primary Examiner* — Atul P. Khare
(74) *Attorney, Agent, or Firm* — Von Rohrscheidt Patents

(57) ABSTRACT

A vibration device for an arrangement for producing a nonwoven fabric web, wherein the vibration device is configured to be arranged in a transverse direction of the arrangement under a conveyor belt for fibers from which the nonwoven fabric web is produced, wherein the vibration device is configured to cause the conveyor belt and the fibers transported thereon to vibrate, and wherein the vibration device includes a beam whose top side is configured to contact a bottom side of the conveyor belt at least temporarily, wherein the beam is supported or only excited or excitable by the vibration device so that the beam essentially performs or permits no vibrations in a conveying direction of the arrangement.

15 Claims, 1 Drawing Sheet

(51) Int. Cl.

| | |
|---|---|
| *B29C 67/20* | (2006.01) |
| *B65G 27/32* | (2006.01) |
| *B65G 47/24* | (2006.01) |
| *C03B 37/10* | (2006.01) |
| *D04H 1/4209* | (2012.01) |
| *D04H 1/4226* | (2012.01) |
| *D04H 1/4234* | (2012.01) |
| *D04H 1/4242* | (2012.01) |
| *D04H 1/58* | (2012.01) |
| *D04H 1/70* | (2012.01) |
| *D04H 3/002* | (2012.01) |
| *D04H 3/004* | (2012.01) |
| *D04H 3/005* | (2012.01) |
| *D04H 3/02* | (2006.01) |
| *D04H 3/12* | (2006.01) |
| *D04H 1/00* | (2006.01) |

(52) U.S. Cl.
CPC ............ *D04H 3/004* (2013.01); *D04H 3/005* (2013.01); *D04H 3/02* (2013.01); *D04H 3/12* (2013.01); *D10B 2101/06* (2013.01); *D10B 2101/08* (2013.01); *D10B 2101/12* (2013.01); *D10B 2101/20* (2013.01)

(56) References Cited

U.S. PATENT DOCUMENTS

| | | | |
|---|---|---|---|
| 5,392,898 A * | 2/1995 | Burgess, Jr. | B65G 27/32 198/770 |
| 6,659,267 B2 * | 12/2003 | Patterson | B65G 27/08 198/771 |
| 7,392,897 B2 * | 7/2008 | Krell | B65G 27/30 198/760 |
| 2018/0036909 A1 * | 2/2018 | Dubey | B28B 1/526 |

* cited by examiner

VIBRATING DEVICE FOR AN INSTALLATION FOR PRODUCING A NONWOVEN, FABRIC WEB

RELATED APPLICATIONS

This application is a continuation of International Patent Application PCT/EP2021/062602 filed on May 12, 2021 claiming priority from German Patent Application DE 10 2020 113 379.0 filed on May 18, 2020, both of which are incorporated in their entirety by this reference.

FIELD OF THE INVENTION

The invention relates to a vibration device for an arrangement for producing a nonwoven fabric web. The invention furthermore relates to an arrangement including the vibration device and to a method for producing a nonwoven fiber web using the arrangement.

BACKGROUND OF THE INVENTION

Generic vibration devices are known in the art. They are being used to realign fibers like e.g. glass fibers on the conveyor belt in particular to distribute them on the conveyor belt more evenly. For this purpose, the known vibration devices include a metal beam that extends transversal to the arrangement, this means transversal to a conveying direction of the fibers on the conveyor belt. The beam is connected with one longitudinal end at a vibration motor which imparts an uneven wobbling motion upon the beam during operations. The beam is in permanent or temporarily interrupted contact with a bottom side of the conveyor belt and thus transfers the vibrating motion to the fibers transported on the conveyor belt.

When the vibrations intensity is correctly adjusted for the respective product, the entire nonwoven fabric realigns on the conveyor belt. This way wrinkles in the nonwoven fabric web can be reduced before the binder cures which improves product quality. Therefore, the vibration devices recited supra are typically arranged directly upstream of the oven inlet or shortly downstream from the last transfer point of the preceding arrangement component. Typically transfer points are critical with respect to wrinkle formation in the product.

It is a problem, however, that the vibrating movements typically become smaller and smaller with an increasing distance from the vibration motor so that the vibrating movement is uneven over a width of the conveyor belt. In order to compensate for this plural vibration devices are arranged behind one another in industrial applications. When the vibration devices are arranged sequentially, a vibration motor is respectively mounted at opposite longitudinal ends of the beam.

In addition to requiring more arrangement space it is a disadvantage of this arrangement of sequential vibration devices that they cause a non-symmetrical rising tension load in the conveyor belt. Additionally, the small hard contact surface between the beam and the bottom side of the conveyor belt causes notable wear of the beam and the conveyor belt. Last not least the random movement of the rod or of the rods renders a controlled adjustment of the vibration intensity e.g. by moving eccentrical weight in a radial direction of the rotation axis and thus controlling product quality more difficult.

BRIEF SUMMARY OF THE INVENTION

Thus, it is an object of the instant invention to solve or mitigate the problems recited supra. In particular an even vibrating movement shall be achieved over an entire width of the conveyor belt, so that the conveyor belt is subjected to a minimum amount of stress. The arrangement according to the invention shall facilitate a control of product quality through the vibration device.

The object is achieved by a vibration device for an arrangement for producing a nonwoven fabric web, wherein the vibration device is configured to be arranged in a transverse direction of the arrangement under a conveyor belt for fibers from which the nonwoven fabric web is produced, wherein the vibration device is configured to cause the conveyor belt and the fibers transported thereon to vibrate, and wherein the vibration device includes a beam whose top side is configured to contact a bottom side of the conveyor belt at least temporarily, wherein the beam is supported or only excited or excitable by the vibration device so that the beam essentially performs or permits no vibrations in a conveying direction of the arrangement.

This restricted movement or movability of the beam helps to prevent an uncontrolled prior art wobbling connection so that a much more uniform vibration excitation of the fibers over an entire width of the conveyor belt is caused. However, it is no necessary any more to arrange plural vibration devices in sequence which reduces cost and arrangement space. Contrary to the prior art beam having a rather small cross section the beam according to the invention can provide a larger contract surface at the bottom side of the conveyor belt so that pressure forces imparted by the beam upon the conveyor belt are distributed over a greater surface which produces wear. Additionally, the controlled movement of the beam helps to control product quality.

In order not to generate significant forces that impact a support of the beam in a direction of the arrangement which would otherwise cause excessive wear, it is advantageous to configure the vibration device so that it essentially exclusively imparts forces upon the beam that are oriented orthogonal to a bottom side of the conveyor belt. Eccentric weights can be arranged so that a "pure" vertical movement of the beam is generated. For this purpose unbalance weights can be arranged so that a "clean" vertical movement of the beam is generated. Thus, a symmetrical arrangement and an opposite direction of rotation of vibrating motors that are arranged in pairs is advantageous.

Advantageously, plural unbalance motors are associated with the beam and further advantageously an even number of unbalance motor is associated with the beam. Thus, two respective unbalance motors can be drivable or driven essentially at the same frequency but with an opposite direction of rotation. This achieves that forces imparted by the two unbalance motors upon the beam in a direction transversal to the conveyor belt cancel each other and the beam moves essentially exclusively in a direction orthogonal to the bottom side of the conveyor belt. Essentially the same frequency means that the frequencies do not have to coincide exactly. Small frequency deviations are typically non-critical since the system self-adjusts towards an energetically stable operating point so that a self-synchronization of the two motors occurs.

Advantageously two respective unbalance motors are essentially arranged symmetrical to a center of the beam with respect to a longitudinal direction of the beam in a transversal direction of the machine. This causes a more uniform vibration excitation and/or support of the beam with respect to a main extension or longitudinal direction.

The beam or at least one beam can extend over an entire width of the conveyor belt or two or more beams can be arranged behind one another which then extend together over the entire width of the conveyor belt. Behind one another in this context means a sequential arrangement of the beams in a transversal direction of the arrangement or along a width of the conveyor belt. This sequential arrangement facilitates producing smaller units in large numbers economically and thereafter the units are assembled in a modular manner to achieve the required width for the application. Thus, the beams arranged behind one another can either be connected with one another so that they jointly form an essentially rigid unit or they can be arranged unconnected and even at a small distance from each other. In the first embodiment, a very even vibration excitation is obtained over an entire width of the conveyor belt. In the second case there is the option to adjust the vibration excitation differently over the width of the conveyor belt.

Another aspect of the instant invention relates to an arrangement for producing a nonwoven fabric fiber web, in particular a nonwoven fabric web made from fibers made from synthetic fibers or industrially produced inorganic fibers, like e.g. glass, metal, mineral, ceramic or carbon fibers including a conveyor belt for the fibers that produce the nonwoven fabric web and the vibration device arranged below the conveyor belt recited supra. The instant invention is suitable in particular for producing a nonwoven fabric web made from glass fibers.

In particular for non-woven webs made from fibers made from synthetically produced polymers or industrially produced and inorganic fibers a vibration device is advantageous since no hydrogen bonds are formed between these fibers, which differs from fibers made from natural cellulose or similar, so that the inorganic fibers typically have to be connected with one another by a bonding agent. However, the fibers lie loosely adjacent to each other until the bonding agent is applied and/or activated and can therefore be rearranged effectively by a corresponding vibration device.

The arrangement according to the invention can furthermore include a forming device for wet laying the fibers onto the conveyor belt. Corresponding inclined screen formers are known in the art.

Another aspect of the instant invention relates to a method for producing a non-woven fiber web, in particular a nonwoven fiber web made from fibers made from synthetically produced polymers or industrially produced inorganic fibers like e.g. glass-, metal-, mineral-, ceramic or carbon fibers using the arrangement described supra, wherein the fibers are at least partially realigned with respect to their position and/or orientation on the conveyor belt by the vibration device.

Advantageously the beam is caused to vibrate essentially only in one direction, namely the direction orthogonal to the bottom side of the conveyor belt. Movements in the transport direction of the fibers however can be impeded or avoided by a support and/or excitation of the beam.

Movements in the transversal direction of the conveyor belt can be impeded or avoided as described supra in that two unbalance motors connected with the beam are driven essentially at identical frequencies however in opposite directions of rotation.

Advantageously, after realigning the fibers they are connected with one another in particular by heating a bonding agent so that the bonding agent cures to connect the fibers with one another.

Advantageously the vibration excitation of the beam can be adjustable or adjusted independently with respect to amplitude and frequency advantageously by adjusting the speed of the unbalance motors, in particular in a radial direction with respect to the rotation axis of the unbalance motor, and/or by a position adjustment of unbalance weights associated with the unbalance motors. This provides an option to influence product quality in a defined manner.

BRIEF DESCRIPTION OF THE DRAWINGS

The invention is subsequently described with reference to on a schematic not to scale drawing figure, wherein.

DETAILED DESCRIPTION OF THE INVENTION

Figure 1:
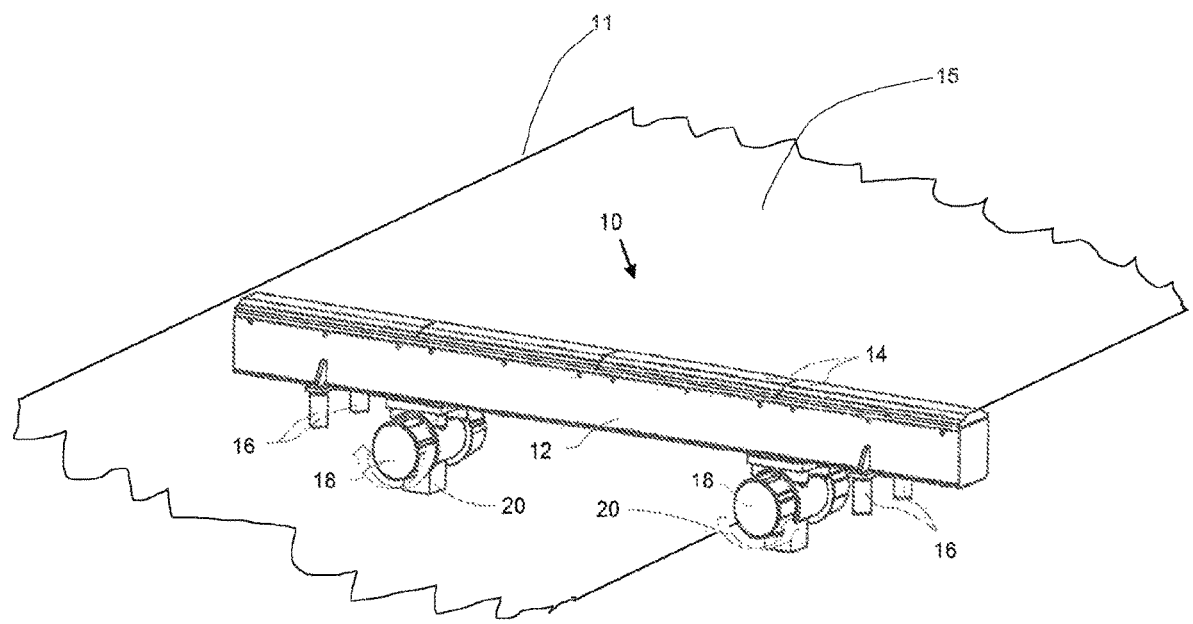
FIG. 1 illustrates a first embodiment of a vibration device according to the invention.

FIG. 1 shows a first advantageous embodiment of a vibration device 10 according to the invention. The vibration device 10 includes a beam 12 whose top side includes plural contact elements 14. The contact elements 14 can be made from a material that slides particularly well, e.g. a ceramic material or can be coated with this type of material. When operating the vibration device 10 according to the invention the contact elements 14 contact a bottom side of a conveyor belt 11 at least temporarily in order to transfer vibrations to the conveyor belt 11 and to realign fibers transported on the transport screen at least partially. Thus, the contact elements 14 can be either configured flat or planar on top or they can have a slightly convex curvature in order to facilitate a sliding of the transport screen. Advantageously however, the contact surface is not configured too small so that compressive forces can be distributed from the beam 12 onto the conveyor belt 11 onto a correspondingly large surface so that a wear at the contact elements 14 and/or the transport screen is small. The beam 12 advantageously extends over an entire width of the conveyor belt 11.

The beam 10 can be supported in beam bearings 16 so that the beam essentially does not allow any movement in the machine direction. The machine direction is defined as the transport direction of the fibers 15 on the conveyor belt 11. The machine direction runs in the plane of the contact elements 14 and orthogonal to the main or longitudinal extension of the beam 12.

The vibration device 10 according to the invention essentially includes two unbalance motors 18 that are driven during operation of the vibration device 10 essentially at identical speed or frequency but with opposite direction of rotation which is indicated by the arrows 20. The two unbalance motors 18 are essentially arranged symmetrical to a center of the beam 12 with respect to the longitudinal extension of the beam 12 in transversal direction of the machine. Due to this arrangement and operation of the two unbalance motors 18, the vibration excitations of the longitudinal extension of the beam 12 cancel each other, whereas vibration excitations orthogonal thereto, namely in a direction towards the conveyor belt 11 or away from the conveyor belt 11 are augmented. Advantageously unbalance weights in the two unbalance motors 18 are arranged at identical angular orientation relative to each other, this means they reach their highest or lowest position at the same moment. The position of the unbalance weights in the unbalance motors 18 is radially adjustable relative to the rotation axis in an order to adjust a strength of the vibration excitation in a controlled manner. By the same token the frequency or speed of driving the two unbalance motors 18 is adjustable in a controlled manner.

The vibration device 10 according to the invention facilitates very uniform alignment of the fibers on the conveyor belt 11 over an entire width of the conveyor belt 11. By the same token wear at the contact elements 14 and at the conveyor belt 11 is minimal. Product quality can be precisely controlled. Furthermore, a single vibration device suffices to obtain the desired result. Arranging plural vibration devices in series is not necessary.

Advantageously the vibration device 10 according to the invention is arranged between a device for applying the fibers to the conveyor belt 11, thus a former or a slanted screen former and a device for connecting the fibers, thus a heating device for curing a bonding agent that connects the fibers.

Figure 2:
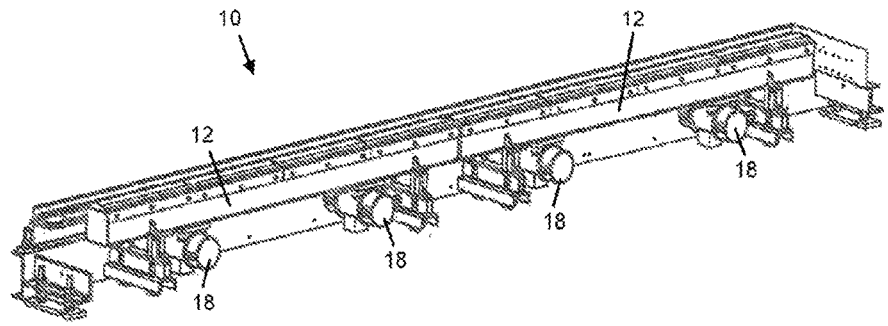
FIG. 2 illustrates a second embodiment of a vibration device according to the invention.

FIG. 2 illustrates a second advantageous embodiment of the vibration device 10 according to the invention. This embodiment differs from the embodiment of the vibration device 10 according to FIG. 1 essentially in that two beams 12 with two respective unbalance motors 18 are arranged in a transversal direction of the machine adjacent or behind one another in order to cover a greater width of the conveyor belt 11.

The two beams 12 can be optionally fixed at each other to form a rigid unit or they can be non-connected with a small distance there between. Advantageously all four unbalance motors 18 are driven essentially at the same frequency wherein the unbalance weights associated with the unbalance motors 18 advantageously reach their highest or lowest position simultaneously. The direction of rotation of two unbalance motors 18 respectively associated with a beam 12 is opposite.

It is appreciated that more than two beams 12 can be arranged adjacent to or behind one another depending on a length of the beams 12 and a width of the conveyor belt 11. Furthermore, more than 2 unbalance motors 18 can be respectively associated with abeam 12. Advantageously, an even number of unbalance motors 18 is respectively associated with a beam 12.

REFERENCE NUMERALS AND DESIGNATIONS 10 vibration device
11 conveyor belt
12 beam
14 contact element
15 fibers
16 beam bearing
18 unbalance motor
20 direction of rotation arrow

What is claimed is:

1. A vibration device for an arrangement for producing a nonwoven fabric web,
wherein the vibration device is arranged in a transverse direction under a conveyor belt of the arrangement for producing the nonwoven fabric web transporting fibers of the nonwoven fabric web, wherein the transverse direction is transverse to a conveying direction of the conveyor belt,
wherein the vibration device performs vibrations orthogonal to the conveyor belt and causes the conveyor belt and the fibers transported thereon to vibrate,
wherein the vibration device includes a beam whose top side contacts a bottom side of the conveyor belt at least temporarily,
wherein the vibration device is excited or excitable so that the beam essentially performs no vibrations in the transverse and conveying directions of the conveyor belt,
wherein the vibration device includes plural unbalance motors connected with the beam, and
wherein two respective unbalance motors of the plural unbalance motors are arranged in sequence along a longitudinal extension of the beam extending transverse to the conveyor belt and the two unbalance motors are essentially arranged symmetrical to a longitudinal center of the beam.

2. The vibration device according to claim 1, wherein the plural unbalance motors comprises an even number of the unbalance motors associated with the beam.

3. The vibration device according to claim 2, wherein two respective unbalance motors of the plural unbalance motors are driven or drivable with essentially identical frequency but with opposite directions of rotation.

4. The vibration device according to claim 1, wherein the beam extends over an entire width of the conveyor belt.

5. The vibration device according to claim 1, wherein the beam comprises plural beams arranged in series and extending over an entire width of the conveyor belt in combination.

6. The vibration device according to claim 1, wherein axes of the two unbalance motors are oriented in a conveying direction of the conveyor belt.

7. The vibration device according to claim 1,
wherein the two unbalance motors run In opposite directions, and
wherein the two unbalance motors run at identical speeds,
wherein unbalance weights of the two imbalance motors are arranged so that they reach their lowest points and their highest points concurrently so that vibration excitations in the longitudinal direction of the beam cancel each other out.

8. An arrangement for producing a nonwoven fabric web made from fibers made from synthetically produced polymers or industrially produced inorganic fibers, the industrially produced fibers selected from the group consisting of glass, metal, mineral, ceramic, or carbon fibers, the arrangement comprising:
the vibration device and conveyor belt according to claim 1, the conveyor belt transporting the fibers of the nonwoven fabric web.

9. The arrangement according to claim 8, further comprising: a device connecting the fibers and arranged downstream of the vibration device.

10. The arrangement according to claim 8, further comprising a forming device configured to lay the fibers onto the conveyor belt wet.

11. A method for producing a non-woven fiber web made from fibers made from synthetically produced polymers or industrially produced inorganic fibers, the industrially produced fibers selected from the group consisting of glass, metal, mineral, ceramic or carbon fibers, using the arrangement according to claim 8, wherein the fibers are at least partially realigned with respect to their position or orientation on the conveyor belt by the vibration device.

12. The method according to claim 11, wherein the beam is caused to vibrate by the vibration device essentially only in one direction orthogonal to a bottom side of the conveyor belt.

13. The method according to claim 12, wherein the vibration device comprises two unbalance motors connected with the beam and driven at essentially identical frequencies but with opposite directions of rotation.

14. The method according to claim 11, further comprising: after said at least partially realigning the fibers, connecting the fibers with one another by heating a bonding agent so that the bonding agent cures to connect the fibers with one another.

15. The method according to claim 11, further comprising: adjusting a vibration excitation of the beam with respect to amplitude and frequency by adjusting the speed of the plural unbalance motors or by a position adjustment of unbalance weights connected to the plural unbalance motors.

* * * * *